US010810280B2

(12) United States Patent
Bondareva et al.

(10) Patent No.: US 10,810,280 B2
(45) Date of Patent: Oct. 20, 2020

(54) DEVICE, SYSTEM AND METHOD FOR DEPLOYING COMMUNICATION DEVICES BASED ON HISTORIC INCIDENTS

(71) Applicant: MOTOROLA SOLUTIONS, INC., Chicago, IL (US)

(72) Inventors: Mariya Bondareva, Bolingbrook, IL (US); Randy L. Ekl, Downers Grove, IL (US); David Kaleko, Oak Park, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 349 days.

(21) Appl. No.: 15/851,047

(22) Filed: Dec. 21, 2017

(65) Prior Publication Data

US 2019/0197080 A1 Jun. 27, 2019

(51) Int. Cl.
*G06Q 50/26* (2012.01)
*G06F 16/487* (2019.01)
(Continued)

(52) U.S. Cl.
CPC ............ *G06F 17/11* (2013.01); *G06F 16/487* (2019.01); *G06F 16/489* (2019.01); *G06F 17/18* (2013.01); *G06Q 10/0631* (2013.01); *G06Q 10/0635* (2013.01); *G06Q 50/26* (2013.01); *G06Q 50/265* (2013.01); *H04L 67/10* (2013.01)

(58) Field of Classification Search
CPC ...... G06F 16/487; G06F 16/489; G06F 17/11; G06F 17/18; G06Q 10/0631–06311; G06Q 50/26–265
See application file for complete search history.

(56) References Cited

U.S. PATENT DOCUMENTS

| 8,949,164 B1 * | 2/2015 | Mohler ................. G06N 7/005 706/46 |
| 9,129,219 B1 * | 9/2015 | Robertson .............. G06N 5/048 |

(Continued)

OTHER PUBLICATIONS

J. Eck, S. Chainey, J. Cameron, and R. Wilson, "Mapping Crime: Understanding Hotspots", Technical report, National Institute of Justice, 2005 (Year: 2005).*

(Continued)

*Primary Examiner* — Matthew D Sandifer
(74) *Attorney, Agent, or Firm* — Perry + Currier, Inc.

(57) ABSTRACT

A device, system and method for deploying communication devices based on historic incidents is provided. Predicted incident risks for a given time are determined for regions, based on distance and time differences of historic incidents, relative to the given time and a region over a first time period and a distance from a region, and incident prediction parameters for weighting the differences. From the predicted incident risks, a subset of the regions having highest predicted incident risks is determined, and a prediction efficiency is determined based on a number of the incidents in the subset relative to a total number of the incidents for the regions. The first time period, the distance, and the incident prediction parameters are varied when determining the predicted incident risks and the subset, to maximize the prediction efficiency for the second time period. Commands are generated for deploying communication devices to the subset.

20 Claims, 8 Drawing Sheets

(51) Int. Cl.
G06F 16/48 (2019.01)
G06F 17/18 (2006.01)
G06Q 10/06 (2012.01)
G06F 17/11 (2006.01)
H04L 29/08 (2006.01)

(56) References Cited

U.S. PATENT DOCUMENTS 10,558,936 B2 * 2/2020 Herman ............ G06Q 10/06311
2015/0066828 A1 3/2015 Vepakomma

OTHER PUBLICATIONS

M. A. Boni and M. S. Gerber, "Area-Specific Crime Prediction Models," 2016 15th IEEE International Conference on Machine Learning and Applications (ICMLA), pp. 671-676, 2016 (Year: 2016).*

S. H. Huddleston and D. E. Brown, "A Statistical Threat Assessment," in IEEE Transactions on Systems, Man, and Cybernetics—Part A: Systems and Humans, vol. 39, No. 6, pp. 1307-1315, Nov. 2009 (Year: 2009).*

Zheng, Xifan, et al., "A Mathematical Modeling Approach for Geographical Profiling and Crime Prediction", 2011 IEEE, pp. 500-503.

Liu, Hua, et al., "A New Point Process Transition Density Model for Space-Time Event Prediction", IEEE Transactions on Systems, Man, and Cybernetics—Part C: Applications and Reviews, vol. 34, No. 3, Aug. 2004, pp. 310-324.

* cited by examiner

DEVICE, SYSTEM AND METHOD FOR DEPLOYING COMMUNICATION DEVICES BASED ON HISTORIC INCIDENTS

BACKGROUND OF THE INVENTION

Deploying responders, such as police officers, and their respective communication devices, to different regions of a jurisdiction, such as a precinct, city or town, can be challenging when the number of responders assigned to monitor the region is insufficient to provide constant monitoring of the whole area. For example, a town may be divided into a large number of regions, but there may be an insufficient number of responders and/or police officers available to patrol all regions for a given shift. Hence, to effectively cover the different regions, the available responders should be effectively deployed to a subset of regions.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
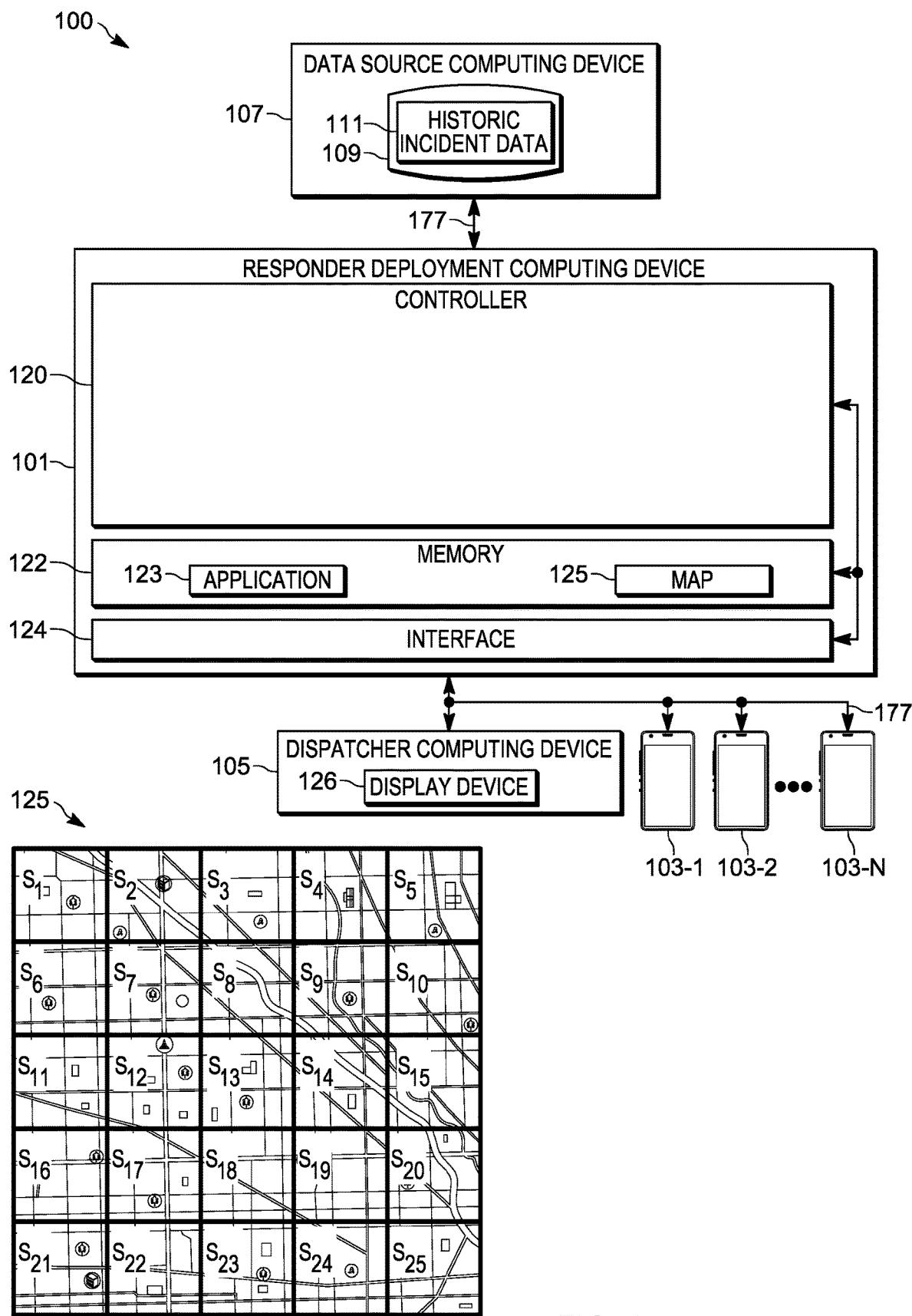
FIG. 1 is a system for deploying communication devices based on historic incidents in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a computing device comprising: a controller and a communication interface, the controller having access to a memory storing historic incident data, the controller configured to: determine, for a plurality of regions, predicted incident risks for a given time, based on distance differences and time differences of historic incidents relative to each of the plurality of the regions and the given time over a first time period and a distance from each of the plurality of regions, the predicted incident risks further based on incident prediction parameters for weighting the distance differences and the time differences, the historic incidents stored as the historic incident data in the memory; determine from the predicted incident risks, a subset of the plurality of the regions having highest predicted incident risks; determine an incident prediction efficiency, for the subset of the plurality of the regions, over a second time period, based on a number of the historic incidents in the subset of the plurality of the regions relative to a total number of the historic incidents for the plurality of the regions; vary the first time period, the distance, and the incident prediction parameters when determining the predicted incident risks and the subset of the plurality of the regions having the highest predicted incident risks, to maximize the incident prediction efficiency for the second time period; and generate one or more commands for deploying, using the communication interface, communication devices to the subset of the plurality of the regions that result in the incident prediction efficiency being maximized.

An aspect of the specification provides a method comprising: determining, at a controller of a computing device, for a plurality of regions, predicted incident risks for a given time, based on distance differences and time differences of historic incidents relative to each of the plurality of the regions and the given time over a first time period and a distance from each of the plurality of regions, the predicted incident risks further based on incident prediction parameters for weighting the distance differences and the time differences; determining, at the controller, from the predicted incident risks, a subset of the plurality of the regions having highest predicted incident risks; determining, at the controller, an incident prediction efficiency, for the subset of the plurality of the regions, over a second time period, based on a number of the historic incidents in the subset of the plurality of the regions relative to a total number of the historic incidents for the plurality of the regions; varying, at the controller, the first time period, the distance, and the incident prediction parameters when determining the predicted incident risks and the subset of the plurality of the regions having the highest predicted incident risks, to maximize the incident prediction efficiency for the second time period; and generating, at the controller, one or more commands for deploying communication devices to the subset of the plurality of the regions that result in the incident prediction efficiency being maximized.

Attention is directed to FIG. 1, which depicts a system 100 for deploying communication devices, and respective responders, based on historic incidents. System 100 comprises a responder deployment computing device 101, a plurality of communication devices 103-1, 103-2 . . . 103-N, a dispatcher computing device 105, and a data source computing device 107 storing a database 109 of historical incident data 111. The responder deployment computing device 101 will be interchangeably referred to hereafter as the computing device 101; the plurality of communication devices 103-1, 103-2 . . . 103-N will be interchangeably referred to hereafter as, collectively, the devices 103 and, generically, as a device 103.

The computing device 101 generally comprises a controller 120, a memory 122 storing an application 123, and a communication interface 124 (interchangeably referred to hereafter as the interface 124). As depicted, the memory 122 further stores a map 125, and the like.

The dispatcher computing device 105 comprises a dispatcher terminal, and the like, that includes a display device 126 as well as other components (not depicted) of dispatcher terminals, such as a respective controller, a respective memory and a respective interface, which are substantially similar to the controller 120, the memory 122, and the interface 124, but adapted for the functionality of the dispatcher computing device 105. The dispatcher computing device 105 may further comprise one or more input devices (e.g. keyboards, pointing devices, etc.), one or more speakers, one or more microphones and/or any other components for enabling a dispatcher to interact with the dispatcher computing device 105. The dispatcher computing device 105 may be used, for example by a dispatcher (not depicted), a shift supervisor (not depicted), and the like to interact with the computing device 105.

The data source computing device 107 may comprise a records management system (RMS) computing device and/or server and comprises components (not depicted) of such records management systems computing devices, such as a respective controller, a respective memory (e.g. storing the database 109) and a respective interface, which are substantially similar to the controller 120, the memory 122, and the interface 124, but adapted for the functionality of the data source computing device 107.

The components of the system 100 are generally configured to communicate with each other via communication links 177, which may include wired and/or wireless links (e.g. cables, communication networks, the Internet, and the like) as desired.

While the computing devices 101, 105, 107 are depicted as separate from one another, one or more of the computing devices 101, 105, 107 may be integrated with one another and/or configured to share processing and/or memory resources using one or more links 177 there between.

In other words, the functionality of the system 100 may be distributed between one or more of the computing devices 101, 105, 107.

Furthermore, in some embodiments, the computing devices 101, 107 may be implemented as one or more servers and/or in a cloud computing environment, with functionality of the computing devices 101, 107 being distributed between one or more servers and/or distributed in the cloud computing environment.

It is assumed that each of the devices 103 are associated with a respective responder, such as a police officer, and the like, and that each of the devices 103 and the respective police officers are to be deployed to a different respective region of an area represented by the map 125. While hereafter deployment of the devices 103 will be described, it is understood that such deployment includes deployment of a responder associated with a respective device 103.

The map 125 is also depicted in FIG. 1. As depicted, the area represented by the map 125 is divided into a plurality of regions $S_1, S_2, \ldots, S_{25}$. While the area represented by the map 125 has been divided into twenty-five regions S, the area represented by the map 125 may be divided into any number of regions S. Furthermore, while the regions S are each square in shape, the regions S may be of any shape, such as hexagons, geometric shapes, non-regular shapes, abstract shapes, and the like. It is generally assumed that the regions S do not overlap, and that the regions S, together, have a total area A (e.g. the area represented by the map 125).

Mathematically, the area A and the regions S not intersecting may be represented by, where B represents the total number of the regions S:

$$(A = \cup_i S_i), 1 \leq i \leq B \qquad \text{Equation (1)}$$

$$(\cap S_i = \emptyset), 1 \leq i \leq B \qquad \text{Equation (2)}$$

$\cup_i S_i$ represents the union of all the regions S, where i is an integer, and $S_i$ represents an $i^{th}$ region S. Hence the area A is the union of all the regions $S_i$.

$\cap_i S_i$ represents an intersection of the regions $S_i$, which is equal to a null set (e.g. $\emptyset$).

It is assumed herein that a number of the devices 103 (and responders) is not sufficient to patrol and/or cover and/or be deployed to the total number B of the regions S, (e.g. as depicted B is twenty-five), even though a responder with a device 103 may visit more than one of the regions S during a shift. However, as the devices 103 are to be at least initially deployed to the regions S, the devices 103 should be deployed to the number N of the regions S with the highest likelihood of having incidents to which the associated responders may respond, where N<B, and/or the number N of the regions S to which the devices 103 should be deployed is less than the total number B of the regions S.

As will be described below, the computing device 101 is generally configured to determine a subset of the plurality of the regions S of the area A represented by the map 125 to which the communication devices 103 and responders are to be deployed, based on the historic incident data 111 based on a varied weighting of the importance of time and location of historic incidents when predicting incident risk in a region S.

In other words, a number N of the regions S in the subset of the plurality of the regions S having the highest predicted incident risks may be predetermined.

Furthermore, while present examples are described with respect to the devices 103 being deployed with responders who are police officers, the devices 103 may alternatively be deployed with any public service responder including, but not limited to, fire service responders, emergency medical service responders, and the like. However, the responders need not be public service responders; rather the responders may be any type of responders and/or people that may be deployed to a region, including, but not limited to, volunteers, sales people, repairmen, and the like.

The devices 103 generally comprise mobile communication devices, including, but not limited to, any suitable combination of radio devices, electronic devices, communication devices, computing devices, portable electronic devices, mobile computing devices, portable computing devices, tablet computing devices, telephones, PDAs (personal digital assistants), cellphones, smartphones, e-readers, mobile camera devices and the like.

In some embodiments, the devices 103 are specifically adapted for emergency service radio functionality, and the like, used by emergency responders and/or emergency responders, including, but not limited to, police service responders (as depicted), fire service responders, emergency medical service responders, and the like. In some of these embodiments, the devices 103 further includes other types of hardware for emergency service radio functionality, including, but not limited to, push-to-talk ("PTT") functionality. Indeed, the devices 103 may be configured to wirelessly communicate over communication channels which may include, but are not limited to, one or more of wireless channels, cell-phone channels, cellular network channels, packet-based channels, analog network channels, Voice-Over-Internet ("VoIP"), push-to-talk channels and the like, and/or a combination. Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP communication path, a push-to-talk channel, and the like.

Furthermore, one or more of the devices 103 may be incorporated into vehicles, and the like (for example emergency service vehicles), as a radio, an emergency radio, and the like.

The devices 103 may further include additional or alternative components related to, for example, telephony, messaging, entertainment, and/or any other components that may be used with computing devices and/or communication devices.

In particular, and as depicted, each of the devices 103 comprises a respective display device.

Attention is next directed to the responder deployment computing device 101 and the database 109 of historic incident data 111.

The controller 120 of the responder deployment computing device 101 includes one or more logic circuits configured to implement functionality for deploying communication devices based on historic incidents. Example logic circuits include one or more processors, one or more electronic processors, one or more microprocessors, one or more ASIC (application-specific integrated circuits) and one or more FPGA (field-programmable gate arrays). In some embodiments, the controller 120 and/or the computing device 101 is not a generic controller and/or a generic computing device, but a controller and/or a computing device specifically configured to implement functionality for deploying communication devices based on historic incidents. For example, in some embodiments, the controller 120 and/or the computing device 101 specifically comprises a computer executable engine configured to implement specific functionality for deploying communication devices based on historic incidents.

The memory 122 comprises a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 1, programming instructions (e.g., machine readable instructions) that implement the functional teachings of the computing device 101 as described herein are maintained, persistently, at the memory 122 and used by the controller 120 which makes appropriate utilization of volatile storage during the execution of such programming instructions.

For example, the memory 122 stores respective instructions corresponding to the application 123 that, when executed by the controller 120, enable the controller 120 to: determine, for a plurality of the regions S, predicted incident risks for a given time, based on distance differences and time differences of historic incidents (e.g. represented by the historic incident data 111) relative to each of the plurality of the regions S, and the given time, over a first time period and a distance from each of the plurality of regions S, the predicted incident risks further based on incident prediction parameters for weighting the distance differences and the time differences; determine, from the predicted incident risks, a subset of the plurality of the regions S, having highest predicted incident risks; determine an incident prediction efficiency, for the subset of the plurality of the regions, over a second time period, based on a number of the historic incidents in the subset of the plurality of the regions relative to a total number of the historic incidents for the plurality of the regions S; vary the first time period, the distance, and the incident prediction parameters for weighting the distance differences and the time differences, when determining the predicted incident risks and the subset of the plurality of the regions S, having the highest predicted incident risks, to maximize the incident prediction efficiency for the second time period; and generate one or more commands for deploying the communication devices 103 to the subset of the plurality of regions S, that result in the incident prediction efficiency being maximized.

The interface 124 is generally configured to communicate using respective links 177 which are wired and/or wireless as desired. The interface 124 may be implemented by, for example, one or more cables, one or more radios and/or connectors and/or network adaptors, configured to communicate wired and/or wirelessly, with network architecture that is used to implement the respective communication links 177.

The interface 124 may include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 802.16 standard, and/or other similar type of wireless transceiver configurable to communicate via a wireless network for infrastructure communications.

In yet further embodiments, the interface 124 may include one or more local area network or personal area network transceivers operating in accordance with an IEEE 802.11 standard (e.g., 802.11a, 802.11b, 802.11g), or a Bluetooth™ transceiver which may be used to communicate to implement the respective communication links 177.

However, in other embodiments, the interface 124 communicate over the links 177 using other servers and/or communication devices and/or network infrastructure devices, for example by communicating with the other servers and/or communication devices and/or network infrastructure devices using, for example, packet-based and/or internet protocol communications, and the like. In other words, the links 177 may include other servers and/or communication devices and/or network infrastructure devices, other than the depicted components of the system 100.

In any event, it should be understood that a wide variety of configurations for the computing device 101 is within the scope of present embodiments.

Figure 2:
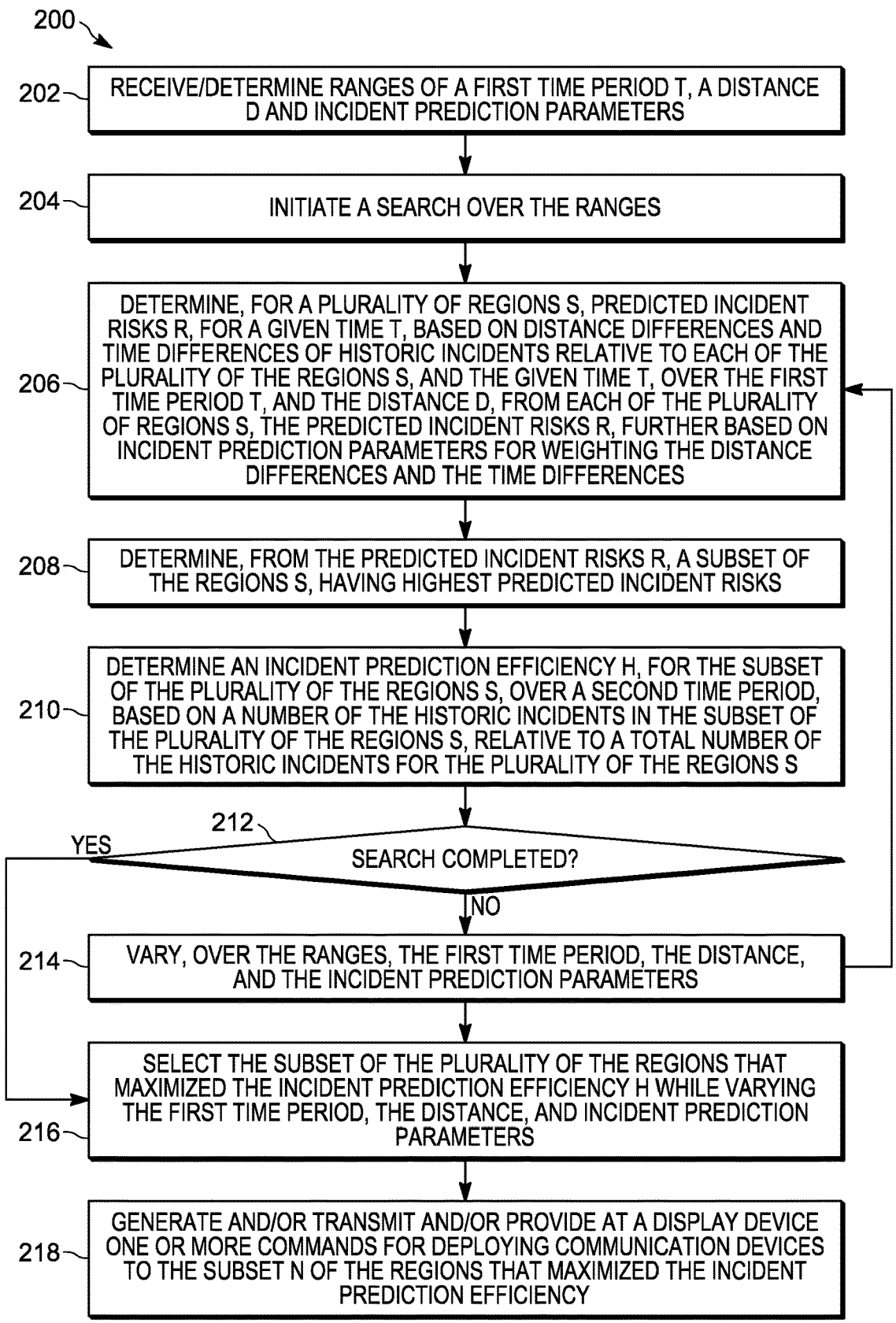
FIG. 2 is a flowchart of a method for deploying communication devices based on historic incidents in accordance with some embodiments.

Attention is now directed to FIG. 2 which depicts a flowchart representative of a method 200 for deploying communication devices based on historic incidents. The operations of the method 200 of FIG. 2 correspond to machine readable instructions that are executed by, for example, the computing device 101, and specifically by the controller 120 of the computing device 101. In the illustrated example, the instructions represented by the blocks of FIG. 2 are stored at the memory 122, for example, as the application 123. The method 200 of FIG. 2 is one way in which the controller 120 and/or the computing device 101 and/or the system 100 is configured. Furthermore, the following discussion of the method 200 of FIG. 2 will lead to a further understanding of the system 100, and its various components. However, it is to be understood that the method 200 and/or the system 100 may be varied, and need not work exactly as discussed herein in conjunction with each other, and that such variations are within the scope of present embodiments.

The method 200 of FIG. 2 need not be performed in the exact sequence as shown and likewise various blocks may be performed in parallel rather than in sequence. Accordingly, the elements of method 200 are referred to herein as "blocks" rather than "steps." The method 200 of FIG. 2 may be implemented on variations of the system 100 of FIG. 1, as well.

At a block 202, the controller 120 receives and/or determines respective ranges over which to vary a first time period T, a distance D, and incident prediction parameters for weighting which are used to determine predicted incident risks for each of the plurality of regions S, at a given time t.

The ranges may be received and/or determined based on input received from the dispatcher computing device 105. Alternatively, the ranges may be received and/or determined based on predetermined ranges stored at the memory 122, for example in the application 123.

The given time t may be a start time of a next shift (and/or a future shift) in which the devices 103 and respective responders are to be deployed, and/or a time within the next shift (and/or a future shift), such as a midpoint time of a shift, and the like.

At a block 204, the controller 120 initiates a search over the ranges, for example by selecting a set of values for each of the first time period T, the distance D, and each of the incident prediction parameters. For example, a smallest value in each of the ranges may be selected for each of the first time period T, the distance D, and each of the incident prediction parameters, however, any values for initiating the search may be selected.

In some embodiments, the search comprises a grid search, which may be performed according to a given granularity and/or given resolution, which may depend on processing resources available to the computing device 101. In some embodiments, the given granularity and/or the given resolution may be received and/or determined at the block 202, for example in a similar manner as the ranges are received and/or determined.

Furthermore, while present embodiments will be described with respect to a grid search, other types of searches are within the scope of the present specification, including, but not limited to, a gradient descent search, and the like.

At a block 206, the controller 120 determines, for the plurality of regions S, predicted incident risks R, at the given time t. The predicted incident risks R are determined based on distance differences and time differences of historic incidents (e.g. represented by the historic incident data 111) relative to each of the plurality of regions S, and the given time t, over the first time period T (e.g. a current first time period in the search and/or the grid search), and the distance D (e.g. a current distance in the search and/or the grid search), from each of the plurality of regions S. The predicted incident risks R are further based on the incident prediction parameters (e.g. current incident prediction parameters in the search and/or the grid search) for weighting the distance differences and the time differences.

At a block 208, the controller 120 determines, from the predicted incident risks R, a subset of the plurality of the regions S, having highest predicted incident risks. For example, a number of the subsets may be set to the number N of the devices 103 to be deployed (e.g. the number of the regions S in the subset of the plurality of the regions S having the highest predicted incident risks may be predetermined).

At a block 210, the controller 120 determines an incident prediction efficiency $\eta$, for the subset of the plurality of the regions that were determined to have the highest predicted incident risks (e.g. for the current first time period T, the current distance D, and the current incident prediction parameters in the search and/or the grid search), over a second time period, based on a number of the historic incidents in the subset of the plurality of the regions S, relative to a total number of the historic incidents for the plurality of the regions S. In general, the second time period is fixed for the method 200, but may be varied for different instances of the method 200. The second time period may also be received and/or determined based on input received at the dispatcher computing device 105 and/or based on a predetermined second time period stored at the memory 122, for example in the application 123.

At a block 212, the controller 120 determines whether search is completed, for example by determining if the ranges of the first time period T, the distance D, and each of the incident prediction parameters have been searched, for example in a grid search.

When the search is not completed (e.g. in a grid search where the ranges of the first time period T, the distance D, and each of the incident prediction parameters have not been searched, and/or a "NO" decision at the block 212), at a block 214, the controller 120 continues with the search, for example by varying the first time period T, the distance D and the incident prediction parameters, the distance differences and the time differences, for example by selecting a next set of values, in the ranges for each of the first time period T, the distance D, and each of the incident prediction parameters. In a grid search, selecting the next set of values may occur according to the granularity and/or resolution of the ranges.

The controller 120 then repeats the blocks 206, 208, 210 with the next set of values, in the ranges for each of the first time period T, the distance D, and each of the incident prediction parameters, to again determine the predicted incident risks (at the block 206) and the subset of the plurality of the regions S, having the highest predicted incident risks (at the blocks 208, 210).

For each set of values of the first time period T, the distance D, and each of the incident prediction parameters, a respective number of the historic incidents used to determine the predicted incident risks at the block 206 generally varies as one or more of the first time period T, and the distance D, are varied. For example, as the distance D increases, the number of the historic incidents used to determine the predicted incident risks may increase as more of the historic incidents may fall within a larger distance D as compared to a smaller distance D; similarly, as the first time period T increases, the number of the historic incidents used to determine the predicted incident risks may increase as more of the historic incidents may fall within a larger first time period T as compared to a smaller first time period T.

The subset of the plurality of the regions S having the highest predicted incident risks may change with each set of values for each of the first time period T, the distance D, and each of the incident prediction parameters.

Indeed, with each execution of the blocks 206, 208, 210, in the search, the controller 120 at least temporarily stores the respective subset of the plurality of the regions S having the highest predicted incident risks (e.g. for a set of values for each of the first time period T, the distance D, and each of the incident prediction parameters), and the respective determined efficiency η.

Returning to the block 212, when the search is completed (e.g. in a grid search, the ranges of the first time period T, the distance D, and each of the incident prediction parameters have been searched, and/or a "YES" decision at the block 212), at a block 216, the controller 120 selects the subset of the plurality of regions S that maximized the incident prediction efficiency η for the second time period.

In other words, the controller 120 selects the respective subset of the plurality of the regions S having the highest predicted incident risks determined at an execution of the block 208 that resulted in the highest/maximized incident prediction efficiency as determined at the block 210.

Put another way, an incident prediction efficiency η assesses the effectiveness of a corresponding predicted incident risk, and when the incident prediction efficiency η is maximized, the predicted incident risk is determined to be most efficient.

Furthermore, in some embodiments, the search (and/or the grid search) may include specifically searching for the set of values for each of the first time period T, the distance D, and each of the incident prediction parameters, that result in a respective subset of the plurality of the regions S, having the highest predicted incident risks, that in turn result in the highest/maximized respective determined efficiency η. In other words, the values for each of the first time period T, the distance D, and each of the incident prediction parameters may be varied at the block 214 in according to trends that lead to increases in previously determined incident prediction efficiencies η.

Hence, at the block 212, the search may be completed (e.g. a "YES" decision at the block 212), when a highest/maximized respective determined efficiency 11 is determined.

At the block 218, the controller 120 generates and/or transmits and/or provides, at a display device, one or more commands for deploying the communication devices 103 to the subset of the plurality of the regions S, that resulted in the incident prediction efficiency η, being maximized. Generally, the one or more commands indicate the subset of the regions S, to which the devices 103 are to be deployed, as selected at the block 216.

For example, the controller 120 may generate one or more commands and cause the one or more commands to be provided at the display device 126 of the dispatcher computing device 105, which may be used to inform a dispatcher the subset of the regions S, to which the devices 103 are to be deployed and/or the subset of the regions S, to which the devices 103 have been deployed.

Similarly, the one or more commands may be transmitted to the communication devices 103. In some embodiments, each of the one or more commands is customized for deploying a respective communication device 103 to a respective region of the subset of the plurality of the regions S. For example, a command transmitted to a given device 103 may identify a specific region $S_i$, of the subset of the regions S, to which the given device 103 is to be deployed.

Example embodiments of the method 200 will now be described with reference to FIG. 3 to FIG. 8. It is assumed in the following discussion that the controller 120 is executing the application 123.

Figure 3:
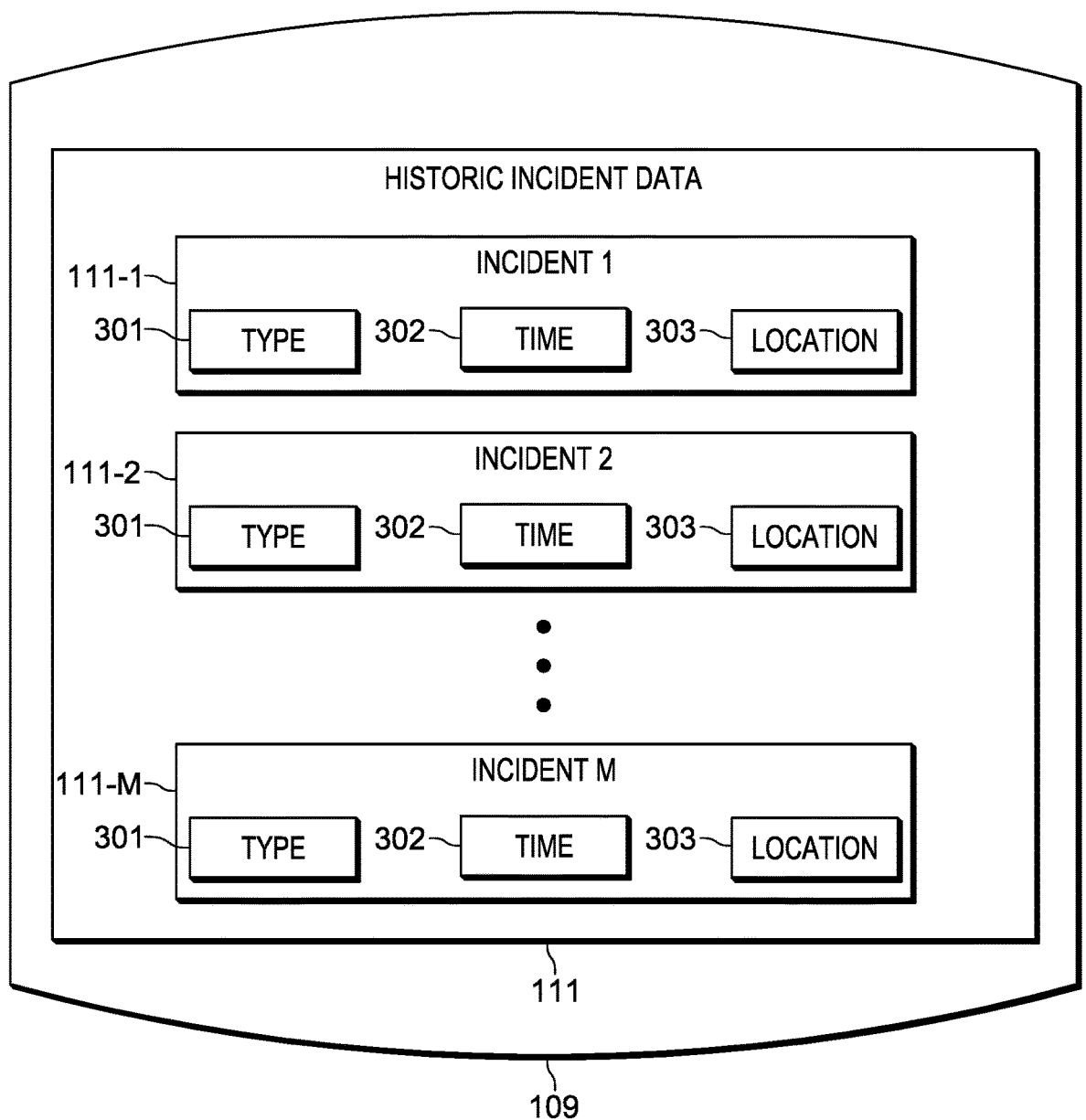
FIG. 3 is a database of historic incidents in accordance with some embodiments.

Attention is next directed to FIG. 3 which depicts an example embodiment of the historic incident data 111 stored in the database 109.

As depicted, the historic incident data comprises "M" sets of historic incident data 111-1, 111-2 . . . 111-M. Each set of incident data 111 includes a respective incident type 301, a respective time 302 of an incident (which generally may include a date and a time) and a respective location 303 of an incident (which may be a set of geographic coordinates, such as global positioning system (GPS) coordinates, longitude and latitude, and the like).

The incident type 301 of a set of incident data 111 may comprise data indicating a respective type of incident that occurred at a respective time 302 and location 303. For example, when the system 100 is generally directed towards deploying responders who are police service officers, the incident type 301 may be a type of police incident and/or crime, for example, a traffic incident, a robbery, a homicide, and the like.

Furthermore, the respective location 303 of a set of incident data 111 may be within the geographic boundaries of the area represented by the map 125 and/or outside the geographic boundaries of the area represented by the map 125 (e.g. within regions surrounding the area represented by the map 125).

Furthermore, the respective time 302 depends on when a respective incident occurred.

Hence, for example, a traffic incident that occurred at a respective date and time of day, and at a respective address and/or respective geographic coordinates will be stored as incident data 111, with an incident type 301 being a "Traffic" incident, and the like, a respective time 302 being the time and day of the traffic incident, and a respective location 303 being the respective address and/or geographic coordinates of the traffic incident.

In any event, the incident data 111 is used by the controller 120 when implementing the method 200, as described hereafter.

Figure 4:
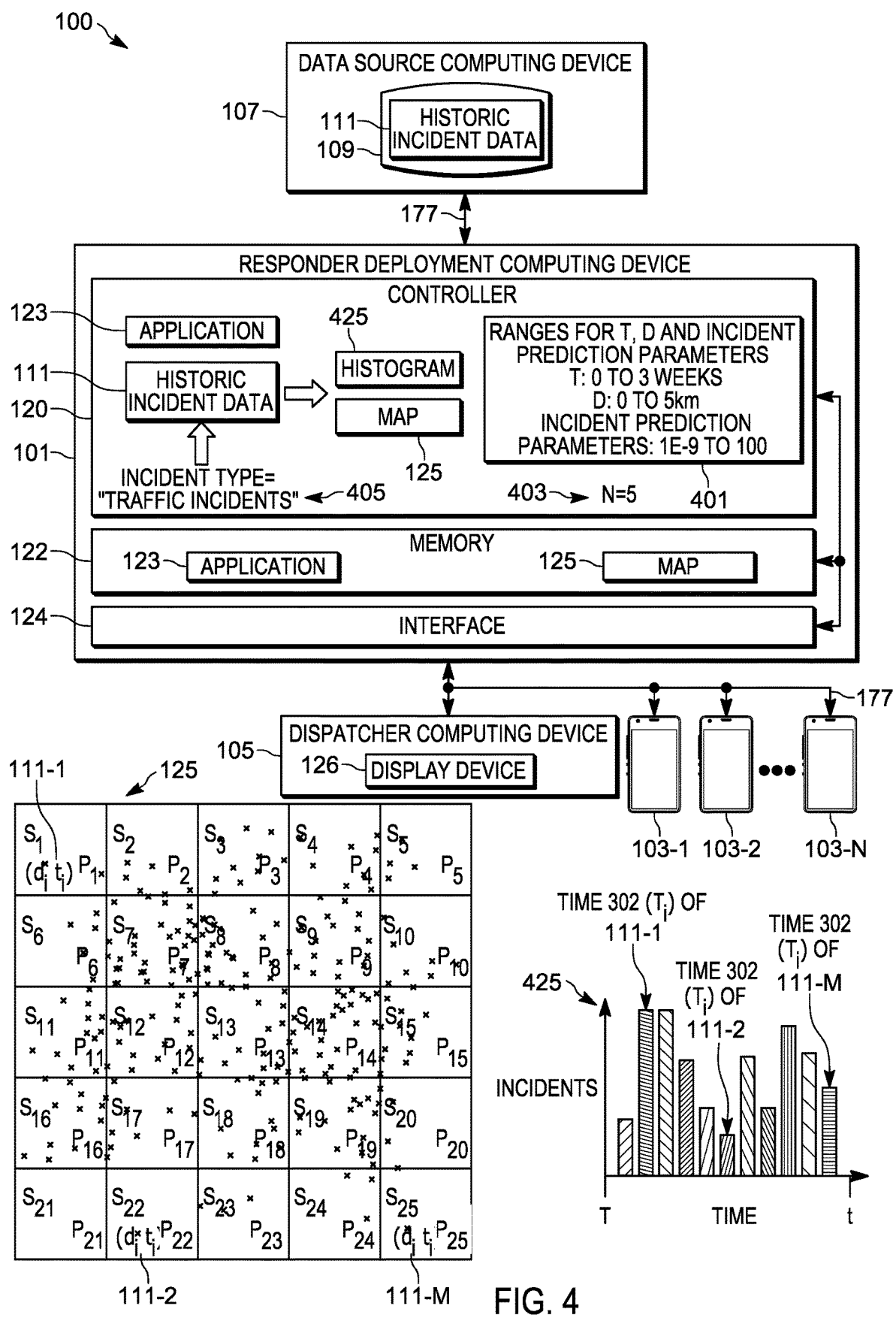
FIG. 4 depicts the system of FIG. 1 initiating a search in accordance with some embodiments.
Figure 5:
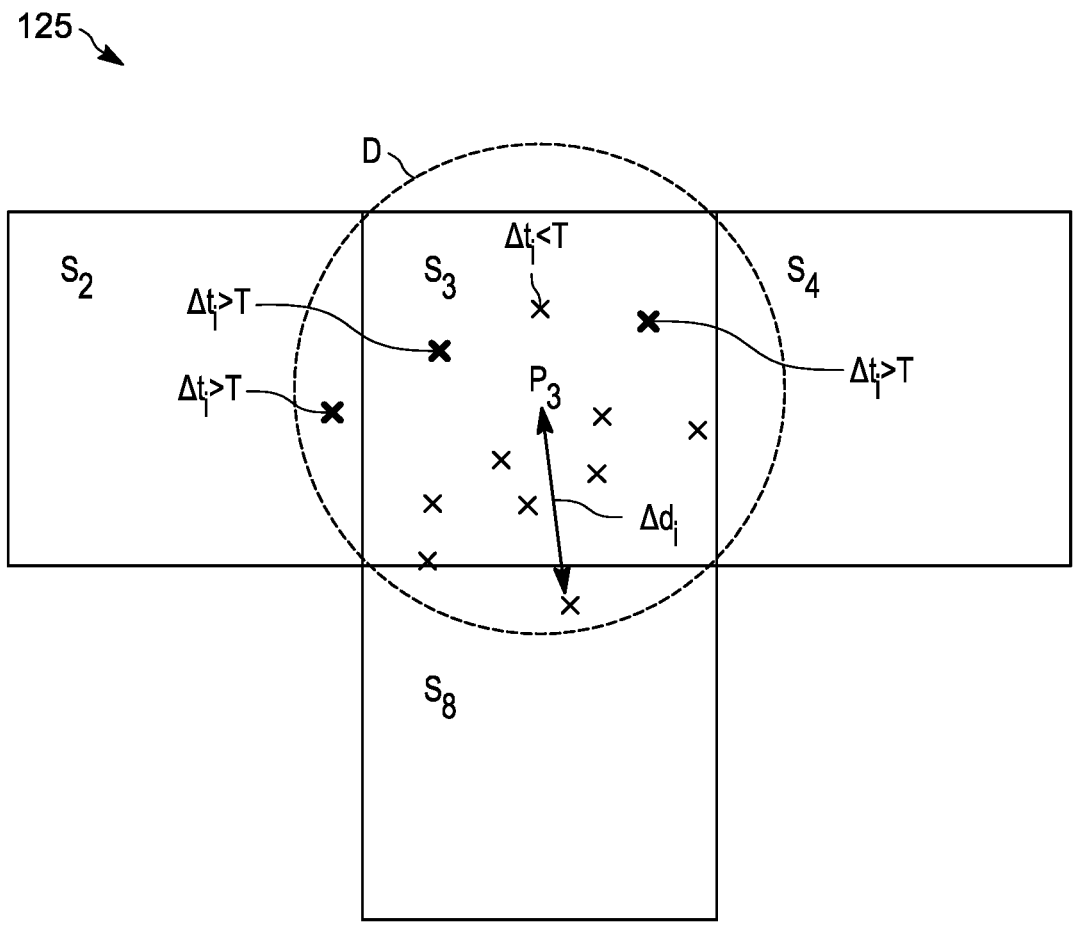
FIG. 5 depicts example locations and times of historic incidents used in determining a predicted incident risk for a region in accordance with some embodiments.

Attention is next directed to FIG. 4 which is substantially similar to FIG. 1, with like elements having like numbers. In particular, FIG. 4 depicts an example embodiment of the blocks 202, 204 of the method 200.

In particular, the controller 120 has received (e.g. at the block 202 of the method 200), ranges 401 for the first time period T, the distance D, and each of the incident prediction parameters. As depicted, the range of the first time period T is 0 weeks to 3 weeks, the range of the distance D is 0 km to 5 km, and the range of each of the incident prediction parameters (described in more detail below) is 1E-9 to 100.

However, the ranges 401 may be any values, and may be determined heuristically. For example, the minimum value of each of the first time period T and the distance D may be "0" and/or any minimum value which includes most recent historic incidents as represented by the incident data 111. Furthermore, the ranges for the incident prediction parameters may be any positive values over which a maximum for the incident prediction efficiency may be determined.

However, the maximum value of the first time period may generally be limited by the oldest time 302 of respective incident data 111, and/or a value that is determined heuristically and/or based on the available processing resources.

For example, as will be described in more detail below, the predicted incident risks for the plurality of regions S are generally performed using a non-linear reciprocal function, and in particular a non-linear reciprocal function where the distance differences and time differences of historical incidents, relative to each of the plurality of regions S, and the incident prediction parameters are in a denominator of the non-linear reciprocal function. An example of such a function is as follows:

$$R(P, t) = \sum_{i=1}^{I} \frac{1}{(1 + \alpha \Delta d_i)(1 + \beta \Delta t_i)} \quad \text{Equation (3)}$$

In Equation (3), R is a predicted incident risk for a region S, P is a point in the region S, t is the given time at which the predicted incident risk is being determined. Furthermore, assuming that T is the first time period over which the historic incidents occur, and D is the distance from the point P within which the historic incidents occur, I is a total number of the historic incidents that occurred within the first time period T and within the distance D, i is an integer number indicating an $i^{th}$ historic incident, $\Delta t_i$ is a time difference between a time of the $i^{th}$ historic incident and the given time t, with $0 < \Delta t_i \leq T$, $\Delta d_i$ is a distance difference from the point P in the region to a location of the $i^{th}$ historic incident, with $0 \leq \Delta d_i \leq D$, $\alpha$ is an incident prediction parameter for weighting the distance difference $\Delta d_i$, and $\beta$ is an incident prediction parameter for weighting the time difference $\Delta t_i$.

Each time difference $\Delta t_i$ is determined using:

$$\Delta t_i = t - t_i \quad \text{Equation (4)}$$

In Equation (4), t is the given time at which the predicted incident risk is being determined, and $t_i$ is a time 302 of the $i^{th}$ historic incident that meets the condition of $0 < \Delta t_i \leq T$; for example, when the given time period T is three weeks, $t_i$ is a time 302 of the $i^{th}$ historic incident that is within the three weeks prior to the given time t at which the predicted incident risk R is being determined.

Similarly, each distance difference $\Delta d_i$ is determined using:

$$\Delta d_i = d(P, d_i) \quad \text{Equation (5)}$$

In Equation (5), P is the location in a region S for which the predicted incident risk R is being determined, $d_i$ is a location 303 of the $i^{th}$ historic incident, and d is a distance between points P and $d_i$. In some embodiments, d may be a Euclidean distance between the points P and $d_i$, while in other embodiments, d may be a Manhattan distance, a road distance, and the like. Regardless, $d_i$ and P generally meet the condition of $0 < \Delta d_i \leq D$; for example, when the distance D is 5 km, $d_i$ is a location 303 of the $i^{th}$ historic incident that is within 5 kms of the given time t at which the predicted incident risk R is being determined. Hence, the distance D may be also be defined with respect to a Euclidean distance, a Manhattan distance, a road distance and the like.

An alternative example of a function for determining predicted incident risk is as follows:

$$R(P, t) = \sum_{i=1}^{I} \frac{1}{(1 + \alpha \Delta d_i + \beta \Delta t_i + \gamma \Delta d_i \Delta t_i)} \quad \text{Equation (6)}$$

Equation (6) is similar to Equation (3), however Equation (6) includes an additional incident prediction parameter $\gamma$ for weighting the cross-product of a time difference $\Delta t_i$ and a distance difference $\Delta d_i$.

Yet further functions may be used for determining predicted incident risk such as:

$$R(P, t) = \sum_{i=1}^{I} \frac{1}{(1 + \alpha (\Delta d_i)^{fd} + \beta (\Delta t_i)^{ft} + + \gamma \Delta d_i \Delta t_i + \varepsilon d (\Delta d_i)^2 + \varepsilon t (\Delta t_1)^2)}, \quad \text{Equation (7)}$$

Equation (7) is similar to Equation (6), however Equation (7) includes additional incident prediction parameters $\varepsilon d$, $\varepsilon t$ for respectively weighting the square of the distance difference $\Delta d_i$, and the square of the time difference $\Delta t_i$; furthermore, each of the terms $\Delta d_i$ and $\Delta t_i$ (e.g. respectively weighted by the incident prediction parameters $\alpha$, $\beta$) may be raised to non-unit powers, as depicted fd and ft, respectively, where fd, ft are non-negative, integer, non-integer and/or fractional values.

Indeed, a general function for the predicted incident risk may be as follows:

$$R(P,t) = \sum_{i=1}^{I} (\sum_{j=0}^{J} \theta_j (\Delta d_i)^{\varphi_j} (\Delta t_i)^{\rho_j})^{-1} \quad \text{Equation (8)}$$

Equation (8) represents a general form of each of Equation (3), Equation (6) and Equation (7). In Equation (8), R is a predicted incident risk for a region S, P is a point in the region S, t is the given time at which the predicted incident risk is being determined. Furthermore, assuming that T is the first time period over which the historic incidents occur, and D is the distance from the point P within which the historic incidents occur, I is a total number of the historic incidents that occurred within the first time period T and within the distance D, i is an integer number indicating an $i^{th}$ historic incident, $\Delta t_i$ is a time difference between a time of the $i^{th}$ historic incident and the given time t, with $0 < \Delta t_i \leq T$, and $\Delta d_i$ is a distance difference from the point P in the region to a location of the $i^{th}$ historic incident, with $0 < \Delta d_i \leq D$. Furthermore, j is a counter for the coefficients $\theta_j$ and the exponents $\varphi_j$, $\rho_j$, with J being the number of terms in denominator of Equation (8), J>0. Coefficients $\theta_j$ and exponents $\varphi_j$, $\rho_j$ are hence each vectors of length J>0. The exponents $\varphi_j$, $\rho_j$ may be integer or non-integer values, with each exponent $\varphi_j$, $\rho_j$ being greater than or equal to 0 (e.g. $\varphi_j$, $\rho_j \geq 0$). Furthermore, when j=0, $\theta_0$ may be "1", and $\varphi_0$, $\rho_0$ may each be "0"; however, when j>0, ranges of one or more of $\theta_j$ are varied over non-negative values. Furthermore, the values of $\theta_j$, $\varphi_j$, $\rho_j$ are selected such that the denominator of Equation (8) is greater than 0, or $(\sum_{j=0}^{J} (\Delta d_i)^{\varphi_j} (\Delta t_i)^{\rho_j}) > 0$.

For example, Equation (8) may be reduced to Equation (3), assuming that J=4, $\theta=[1, \alpha, \beta, \alpha\beta]$, $\varphi=[0, 1, 0, 1]$, and $\rho=[0, 0, 1, 1]$. Similarly, Equation (8) may be reduced to Equation (6), assuming that J=4, $\theta=[1, \alpha, \beta, \gamma]$, $\varphi=[0, 1, 0, 1]$, and $\rho=[0, 0, 1, 1]$. Similarly, Equation (8) may be reduced to Equation (7), assuming that J=6, $\theta=[1, \alpha, \beta, \gamma, \varepsilon d, \varepsilon t]$, $\varphi=[0, fd, 0, 1, 2, 0]$, and $\rho=[0, 0, ft, 1, 0, 2]$.

Hence, regardless of whether Equation (3), Equation (6), Equation (7) or Equation (8) is used to determine predicted incident risk, the older the historic incidents and/or the further the historic incidents are from a given region $S_i$ for which a predicted incident risk is being determined, the larger the time differences and/or the distance differences, and the less they will contribute to the functions.

Hence, upper boundaries may be placed on the ranges 401 for the first time period T, the distance D, such that, above the upper boundaries, historic incidents that occur outside the upper boundaries may contribute less than a given percentage to the function (e.g. 1%).

However, if the available processing resources are sufficient, upper boundaries may be selected that include all the historic incidents represented by the historic incident data 111.

Each of the incident prediction parameters $\alpha$, $\beta$, $\gamma$, $\varepsilon d$, $\varepsilon t$, $\theta_j$ are assumed to be in respectively reciprocal units of the distance difference $\Delta d_i$, the time difference $\Delta t_i$ the cross-product $\Delta d_i \Delta t_i$, the square of $\Delta d_i$, the square of $\Delta t_i$. an the cross-product $(\Delta d_i)^{\varphi j}(\Delta t_i)^{\rho j}$. Furthermore, the maximum values in the ranges 401 may be selected to be any arbitrary positive value, and the like, and/or large enough where the ranges 401 result in maximizing the incident prediction efficiency $\eta$. As depicted, the maximum values in the ranges 401 are selected to be "100", or any value where the ranges 401 result in maximizing the incident prediction efficiency $\eta$.

Hereafter, Equation (3) will be used in an example embodiment for determining the predicted incident risk. In these example embodiment, as the incident prediction parameters $\alpha$, $\beta$ are varied in the search and/or the grid search, the incident prediction parameter $\alpha$ generally assists in determining the relative importance of the times of the historic incidents, with respect to the given time t, and the incident prediction parameter $\beta$ generally assists in determining the relative importance of the locations of the historic incidents, with respect to the location of a region S for which the predicted incident risk is being determined.

Hence, as each of the incident prediction parameters $\alpha$, $\beta$ are weighting incident prediction parameters, and as the relative predicted incident risks for the regions S are being compared to determine which regions S have the highest predicted incident risks, their maximum values are generally arbitrary and may be same or different. Similarly, when Equation (6) or Equation (7), and the like, are used to determine predicted incident risk, the incident prediction parameters $\gamma$, $\varepsilon d$, $\varepsilon t$ generally assist in determining, respectively, the relative importance of the cross-products of the time difference and distance difference, and the distance difference squared, and hence their maximum values may also arbitrary.

Also depicted in FIG. 4 is a graphic example of an initiation of the and/or the grid search at the block 204 of the method 200. In particular, the number N of regions S of the map 125 to which the devices 103 are to be deployed has been determined to be "5", as indicated by the parameter 403 of N=5. Similarly, an incident type of "Traffic Incidents" has been determined, as indicted by the parameter 405 (e.g. which may be received from the dispatcher computing device 105). Hence, in the example embodiment of FIG. 4, devices 103 (and their respective responders) are to be deployed to five regions S, to deal with traffic incidents. In some embodiments, more than one device 103 may be deployed to each of the five regions S. In other words, while in FIG. 1 and FIG. 4 the number N of devices 103 is the same as the number N of regions S to which the devices 103 are to be deployed, the number of devices 103 may be greater than (or less than) the number N of regions S to which the devices are to be deployed.

In other words, in the example embodiment, the predicted incident risks and the incident prediction efficiency will be determined for a given incident type 301 of the historic incidents. However, in other embodiments, the predicted incident risks and the incident prediction efficiency may be determined for all incident types and/or independent of incident type.

As also depicted in FIG. 4, the historic incident data 111, including respective times 302 and locations 303 of the historic incidents, have been retrieved from one or more of: the database 109 of the historic incidents; and the data source computing device 107 which, as depicted, is different from the computing device 101.

In particular, the historic incident data 111 has been combined with the map 125 to show locations 303 of the historic incidents. For clarity, the geographic features (roads etc.) of the map 125 are not depicted in FIG. 4.

For example, each "x" on the map 125 of FIG. 4 corresponds to a geographic location 303 of an historic incident represented by the incident data 111. For example, locations 303 "$d_i$" of each of the incident data 111-1, 111-2, 111-M are shown on the map 125, with respective times 302 "$t_i$" of each of the incident data 111-1, 111-2, 111-M.

To further illustrate that the historic incidents occur at different respective times 302, the controller 120 has further generated a histogram 425 for the historic incidents that occur within the first time period T (e.g. prior to the given time t) and the position of the respective times 302 for each of the incident data 111-1, 111-2, 111-M are shown on the histogram 425.

However, the mapping the locations 303 of the historic incident data 111 on the map 125 and determining the histogram 425 is optional, and indeed are shown on FIG. 4 merely to visually illustrate the initiation of the method 200 and the times 302 and locations 303 of the historic incidents.

It will be assumed in the example embodiment that the method 200 uses the Equation (3), when initiating the search and/or the grid search. As each of the first time period T, the distance D, and the incident prediction parameters $\alpha$, $\beta$ are varied, the search, and/or the grid search, will be four-dimensional. When the method 200 uses Equation (6) or Equation (7), the search, and/or the grid search, will be five-dimensional and seven-dimensional, respectively, as the incident prediction parameter $\gamma$ and/or the incident prediction parameters $\varepsilon d$, $\varepsilon t$ are also varied. In general, the search and/or a grid search will be 2+W dimensional, where W is the number of weighting incident prediction parameters.

Hence, to determine the predicted incident risk R for each of the regions S, values for each of the first time period T, the distance D, and the incident prediction parameters $\alpha$, $\beta$ are selected at the block 204 (according to the ranges 401), and the predicted incident risk R is determined for each of the regions S. For example, the predicted incident risk R is determined using, the given time t, and a respective center point P in each of the regions S as the location of the region, which is used in Equation (5). For example, as depicted in FIG. 4, the region $S_1$ has a center point $P_1$, the region $S_2$ has a center point $P_2$, etc. However, points, other than center points, in a region S may be used when determining the predicted incident risk R.

Furthermore, when determining the predicted incident risk R for a first time period T and a distance D, only the historic incidents that are within the first time period T and the distance D are used to determine the predicted incident risk. For example, attention is next directed to FIG. 5 which depicts a portion of the map 125, including the regions $S_2$, $S_3$, $S_4$, $S_8$. Presuming that the predicted incident risk R for the region $S_3$ is being determined for a first time period T and a distance D, only historic incidents, each indicated by a respective "x" on the portion of the map 125, that are within (for example) a circle having a radius corresponding to the distance D are used to determine the predicted incident risk R. Included are historic incidents that fall within other regions and/or neighboring regions, such as $S_8$. Indeed, as depicted $\Delta d_i$ is determined between the point $P_3$ and a location of an historic incident in the region $S_8$.

However, excluded from the determination of the predicted incident risk R for the region $S_8$ are historic incidents for which $\Delta t_i$ is greater than the first time period T. As depicted, three of the historic incidents correspond to times in which $\Delta t_i$ is greater than the first time period; these historic incidents are indicated by a respective "x" having a thicker line thickness than the other historic incidents represented in FIG. 5, which are assumed to have a $\Delta t_i$ that is less than the first time period.

Once the predicted incident risk R is determined for each of the regions S, at the block 208, a number N of the regions S having the highest predicted incident risk R is determined, for example the 5 regions S having the highest predicted incident risk.

Figure 6:
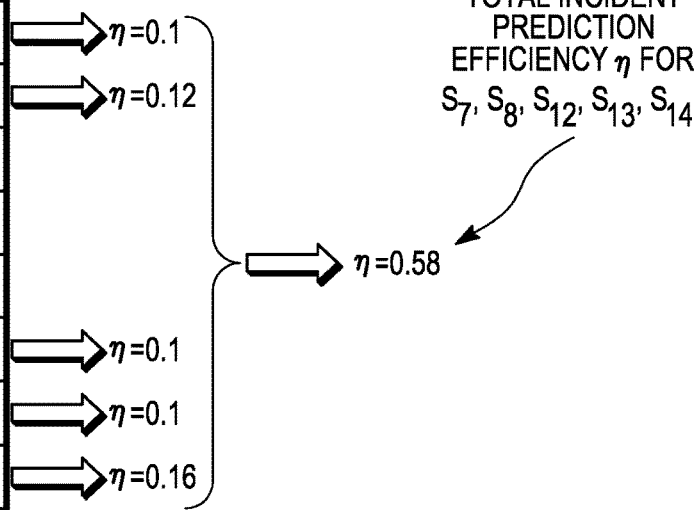
FIG. 6 depicts example predicted incident risks for a plurality of regions, a determination of a subset of the regions having highest predicted incident risks, and determination of a corresponding total incident prediction efficiency in accordance with some embodiments.

For example, attention is directed to FIG. 6 which depicts an example embodiment of the blocks 206, 208, 210 of the method 200. In particular, FIG. 6 depicts respective predicted incident risk R for each of the regions S, as determined by the controller 120 (e.g. at the block 206), for example, for a first time period T of 1 week, a distance D of 0.5 km, an incident prediction parameter $\alpha$ of 20 and an incident prediction parameter $\beta$ of 80, again assuming that Equation (3) is used in the method 200 in an example embodiment.

The values of respective predicted incident risk R for each of the regions S depicted in FIG. 6 are merely examples to show that the respective predicted incident risk R for each of the regions S are not the same.

As depicted, the controller 120 has determined (e.g. at the block 208) that the regions $S_7$, $S_8$, $S_{12}$, $S_{13}$, $S_{14}$ are the regions having the highest predicted incident risk for the depicted values of the first time period T, the distance D, and the incident prediction parameters $\alpha$, $\beta$.

For these 5 regions (e.g. the subset of the regions in the block 208), the controller 120 determines (e.g. at the block 210 of the method 200), the incident prediction efficiency $\eta$ for a second time period, for example the last three months of shifts to which the devices 103 were previously deployed. The incident prediction efficiency $\eta$ generally assesses the predicted incident risk; hence, in FIG. 6, determined incident prediction efficiency $\eta$ assesses the predicted incident risk determined using the first time period T of 1 week, the distance D of 0.5 km, the incident prediction parameter $\alpha$ of 20 and the incident prediction parameter $\beta$ of 80.

The second time period may be chosen to reflect incident prediction performance for some reporting period, for example a weekly reporting period, a monthly reporting period, a quarterly reporting period, a six month reporting period, a yearly reporting period, and the like, for a police department and the like.

However, the second time period may also be chosen using other types of rules; for example, the second time period may be chosen based on a crime rate in region represented by the map 125 and/or the surrounding areas. For example, the second time period may be chosen to include a number of crimes that is high enough such that the efficiency $\eta$ varies "reasonably" smoothly in the parameter space of T, D, $\alpha$, $\beta$. For less frequent crime types and/or smaller crime rates, the second time period length may be increased to accrue enough historical crime statistics such that the efficiency $\eta$ varies "reasonably" smoothly. In some example embodiments, such "reasonable" smoothness may be defined using a threshold number of historical incidents (e.g. represented by the incident data 111) that are within the second time period (e.g. the second time period may be increased until the second time period includes a number of sets of the incident data 111 that is at least the threshold number of historic incidents). In other example embodiments, such "reasonable" smoothness may be defined using a threshold difference between two determined efficiencies 11 for adjacent points in the grid search.

The second time period may be expressed as a single time period, or as a plurality of adjacent smaller time periods. For example, as the system 100 may generally be used for deploying responders, who are usually deployed in shifts, the second time period may be expressed as a plurality of shifts. Example equations for determining the incident prediction efficiency $\eta$ are discussed hereafter.

In general, an incident prediction efficiency $\eta$ for a single region S comprises a ratio of the number of historic incidents that occurred in the region S to the total number of historic incidents that occurred in all the regions S, or the entirety of the area A (e.g. as defined in Equation (1)). Hence, the incident prediction efficiency $\eta$ for the subset of the N regions S determined to have the highest predicted incident risks (e.g. as determined at the blocks 206, 208) is the sum of the incident prediction efficiencies $\eta$ for the subset of the N regions S.

For example, assuming that the second time period is not expressed as a plurality of smaller time periods (e.g. the second time period may be a time corresponding to one shift, or longer, for example several weeks or several months), the incident prediction efficiency $\eta$ for the subset of the N regions S may be determined from:

$$\eta(N) = \frac{\sum_{j=1}^{N} C(S_j)}{C(A)} \quad \text{Equation (9)}$$

In Equation (9), $\eta(N)$ is the incident prediction efficiency for the subset of the plurality of the regions S over the second time period, N is the total number of the subset of the plurality of the regions S, j is an integer number indicating a $j^{th}$ region S of the subset of the plurality of the regions S, $C(S_j)$ is the number of the historic incidents that occurred in the $j^{th}$ region S over the second time period, where S is an identifier of a region, C(A) is the total number of the historic incidents that occurred in the plurality of the regions S over the second time period, where A identifies all of the plurality of the regions S (e.g. the area A).

Alternatively, when the second time period is expressed as a plurality of smaller time periods, such as a plurality of shifts, incident prediction efficiency $\eta$ for the subset of the N regions S may be determined from:

$$\eta(K, N) = \frac{\sum_{k=1}^{K} \sum_{j=1}^{N} C(S_j^k)}{\sum_{k=1}^{K} C(A^k)} \quad \text{Equation (10)}$$

In Equation (10), $\eta(K, N)$ is the incident prediction efficiency for the subset of the plurality of the regions S over the second time period defined by a total number K of smaller time periods (e.g. shifts), where N is the total number of the subset of the plurality of the regions S, k is an integer number indicating a $k^{th}$ smaller time period (e.g. a $k^{th}$ shift), j is an integer number indicating a $j^{th}$ region of the subset of the plurality of the regions S, $C(S_j^k)$ is a number of the historic incidents that occurred in the $j^{th}$ region in the subset of the plurality of the regions S during a $k^{th}$ smaller time period, where S is an identifier of a region, $C(A^k)$ is a total number of the historic incidents that occurred in the plurality of the regions during the $k^{th}$ smaller time period, where A identifies all of the plurality of the regions S (e.g. the area A).

Returning to FIG. 6, the individual incident prediction efficiencies η are determined for the regions $S_7$, $S_8$, $S_{12}$, $S_{13}$, $S_{14}$ (e.g. respectively 0.1, 0.12, 0.1, 0.1, 0.16) and summed to the incident prediction efficiency η (e.g. 0.58) using Equation (9) or Equation (10).

Put another way, if devices 103 and their respective responders were deployed to the five regions $S_7$, $S_8$, $S_{12}$, $S_{13}$, $S_{14}$, the controller 120 has predicted that 58% of incidents (e.g. traffic incidents) in the total area A will be covered by the devices 103 and their respective responders, at least as based on the historic incidents as represented by the historic incident data 111.

Assuming Equation (9) is used to determine the total incident prediction efficiency η, when determining $C(S_j)$ for each of the regions $S_7$, $S_8$, $S_{12}$, $S_{13}$, $S_{14}$, only the historic incidents that occurred in the regions $S_7$, $S_8$, $S_{12}$, $S_{13}$, $S_{14}$ within the second time period are counted. Similarly, when determining, for C(A) for the total area A (e.g. all the regions S), only the historic incidents that occurred in the total area A within the second time period are counted.

Assuming Equation (10) is used to determine the total incident prediction efficiency η, it is further assumed that the start and stop times of the K shifts are stored in the memory 122 and/or available to the controller 120. For example, the responders operating the devices 103 may be deployed in shifts that occur periodically, such as every day at eight hour intervals (e.g. starting at 12 am, 8 am, and 4 pm). The start and stop times of each $k^{th}$ shift may be used to determine which historic incidents to count as occurring in the $k^{th}$ shift in a given one of the regions $S_7$, $S_8$, $S_{12}$, $S_{13}$, $S_{14}$, to determine each $C(S_j^k)$, as well as which historic incidents to count as occurring in the $k^{th}$ shift in all the regions S, to determine each $C(A^k)$.

Hence, at each execution of the block 210 in the search, the incident prediction efficiency η is determined for the subset of the N regions S, and stored with indicators of the subset of the regions S used to determine the incident prediction efficiency η.

Figure 7:
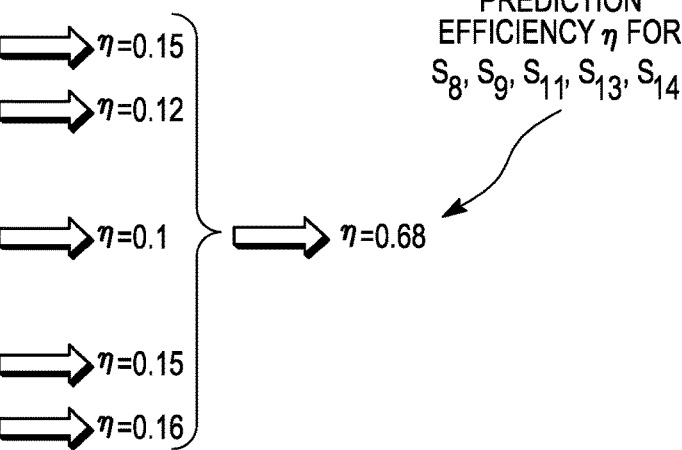
FIG. 7 depicts another example of predicted incident risks for a plurality of regions, a determination of a subset of the regions having highest predicted incident risks, and determination of a corresponding total incident prediction efficiency in accordance with some embodiments.

For example, attention is directed to FIG. 7 which depicts an example embodiment of the blocks 206, 208, 210 of the method 200 when being again executed by the controller 120 using the same values for the first time period T of 1 week, and the distance D of 0.5 km used in FIG. 6, but with the incident prediction parameter α changed to 80 and the incident prediction parameter β changed to 30 in the search and/or the grid search. Hence, in the example of FIG. 7, when determining the predicted incident risks R at the block 206, the subset of the regions S at the block 208, and the incident prediction efficiency η at the block 210, the time differences $\Delta t_i$ are given a higher weight than the distance differences $\Delta d_i$, as compared to the example of FIG. 6.

As depicted in FIG. 7, the 5 regions having the highest predicted incident risks R are the regions $S_8$, $S_9$, $S_{11}$, $S_{13}$, $S_{14}$ and the incident prediction efficiency η for the regions $S_8$, $S_9$, $S_{11}$, $S_{13}$, $S_{14}$ is 0.68, which is higher than the incident prediction efficiency η for the regions $S_7$, $S_8$, $S_{12}$, $S_{13}$, $S_{14}$ determined in the example in FIG. 6. Hence, the higher weighting of the time differences $\Delta t_i$ as compared to the distance differences $\Delta d_i$ result in better "coverage" of the area A represented by the map 125.

Put another way, if devices 103 and their respective responders were deployed to the five regions $S_8$, $S_9$, $S_{11}$, $S_{13}$, $S_{14}$, the controller 120 has predicted that 68% of incidents (e.g. traffic incidents) in the total area A will be covered by the devices 103 and their respective responders, at least as based on the historic incidents as represented by the historic incident data 111, as compared to only 58% if the devices 103 and their respective responders were deployed to the five regions $S_7$, $S_8$, $S_{12}$, $S_{13}$, $S_{14}$.

While the examples depicted in FIG. 6 and FIG. 7 show only the incident prediction parameters α, β being varied, it is understood that in executing the method 200, the first time period T and the distance D are also varied.

Upon execution of the block 216, the highest incident prediction efficiency η is selected from the stored incident prediction efficiencies η, and the devices 103 are deployed to the corresponding subset of the regions S.

With reference to the examples in FIG. 6 and FIG. 7, assuming that the regions $S_8$, $S_9$, $S_{11}$, $S_{13}$, $S_{14}$ maximized the incident prediction efficiency η for the second time period used to determine incident prediction efficiency η, the regions $S_8$, $S_9$, $S_{11}$, $S_{13}$, $S_{14}$ are selected as the subset of the regions S to which to deploy the devices 103 and the respective responders.

Figure 8:
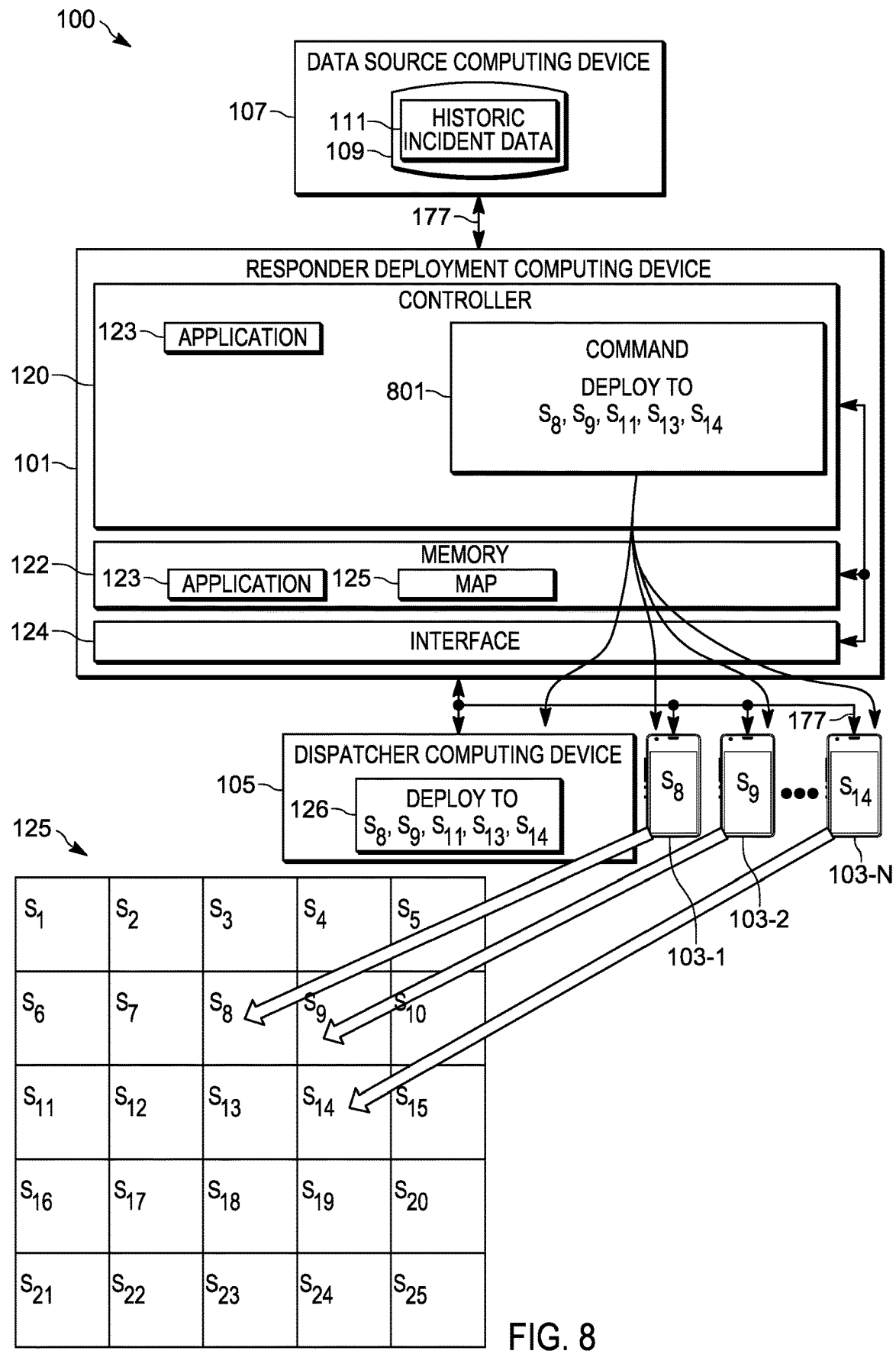
FIG. 8 depicts communication devices being deployed in accordance with some embodiments.

For example, attention is directed to FIG. 8, which is substantially similar to FIG. 1, with like elements having like numbers. In particular, FIG. 8 depicts an example embodiment of the block 218 of the method 200. It is assumed in FIG. 8 that the regions $S_8$, $S_9$, $S_{11}$, $S_{13}$, $S_{14}$ were selected by the controller 120 (e.g. when executing the block 216). In FIG. 8, the controller 120 is generating a command 801 for deploying devices 103 to the regions $S_8$, $S_9$, $S_{11}$, $S_{13}$, $S_{14}$. As depicted, the controller 120 further transmits the command 801 to the dispatch computing device 105 via a link 177 where the command 801 is provided at the display device 126.

Alternatively, as depicted, the command 801 is also transmitted to the devices 103. In some embodiments, also as depicted, the command 801 may be customized for deploying a respective communication device 103 to a respective region of the subset $S_8$, $S_9$, $S_{11}$, $S_{13}$, $S_{14}$ of the plurality of the regions S. However, it is understood that, during a shift, a device 103, and a respective responder, may visit regions S other than a region $S_i$ to which is device 103 is initially deployed including any of the regions $S_8$, $S_9$, $S_{11}$, $S_{13}$, $S_{14}$; furthermore, a device 103 may visit any of the regions $S_8$, $S_9$, $S_{11}$, $S_{13}$, $S_{14}$ (and/or other regions) multiple times during a shift, though a patrol during a shift may be focused on the region $S_i$ to which the device 103 was initially deployed.

As depicted in FIG. 8, at a device 103, a respective display device shows that: the command 801 transmitted to the device 103-1 has been customized to deploy the device 103-1 to the region $S_8$ (e.g. as the respective display devices provides an identifier "$S_8$" of the region $S_8$); the command 801 transmitted to the device 103-2 has been customized to deploy the device 103-2 to the region $S_9$ (e.g. as the respective display devices provides an identifier "$S_9$" of the region $S_9$); and the command 801 transmitted to the device 103-N has been customized to deploy the device 103-N to the region $S_{14}$ (e.g. as the respective display devices provides an identifier "$S_{14}$" of the region $S_{14}$). Deployment of a device 103-1, 103-2, 103-N to a respective region $S_8$, $S_9$, $S_{14}$ is represented in FIG. 8 by an arrow from a device 103 to a respective regions S. While not depicted, it is assumed that other devices 103 are similarly deployed to the regions $S_{11}$, $S_{13}$.

While present examples have been described with respect to an assumption that the incident prediction efficiency η is determined for the subset of the plurality of regions S, with the number N of the regions S in the subset being scalar (e.g. one value), in other embodiments, the number "N" may be a C-dimensional vector, where C is an integer value, for example as shown in Equation (11):

$$N = (N_1, N_2, \ldots, N_C) \quad \text{Equation (11)}$$

In Equation (11), each of $N_1$, $N_2$, ..., $N_C$ are integer numbers with $N_1 < N_2 < \ldots < N_C \leq B$. For example, when $N_C = 5$ (similar to the examples described above with respect to FIG. 4 to FIG. 8), N=(1, 2, 3, 4, 5).

In such embodiments, the incident prediction efficiency $\eta_c$ is determined for each value of $N=(N_1, N_2, \ldots, N_C)$, and an aggregated incident prediction efficiency η is determined at the block 210, based on respective incident prediction efficiencies $\eta_c$ determined for a plurality of subsets of the regions S over the second time period, each of the respective incident prediction efficiencies $\eta_c$ weighted, in the aggregated incident prediction efficiency according to a predetermined importance of each of the plurality of the subsets of the regions S.

For example, consider a scenario in which there are five devices 103, and respective responders, maximum to deploy into the regions S. However, 20% of the time, one of the responders calls in sick, 5% of the time two of the responders call in sick, 2% of the time three responders call in sick, and 1% of the four responders call in sick. Hence, 67% of the time there are five devices 103 (and respective responders) available to be deployed, 20% of the time there are only four devices 103 available to be deployed, 5% of the time there are only three devices 103 available to be deployed, 2% of the time there are only two devices 103 available to be deployed, and 1% of the time there is only one device 103 available to be deployed.

In these embodiments, the incident prediction efficiencies $\eta_c$ are determined, using the method 200, for each of N=(1, 2, 3, 4, 5), in the search, and/or the grid search, and at the block 210, an aggregate incident prediction efficiency 11 is determined, for example using the following:

$$\eta(K, N) = \Sigma_{c=1}^{C} \omega_c \eta_c(K, N_c) \quad \text{Equation (12)}$$

In Equation (12), η(K, N) is the aggregate incident prediction efficiency, c is an integer number from 1 to C (and/or the size of the vector $N=(N_1, N_2, \ldots, N_C)$), $\eta(K, N_c)$ is the incident prediction efficiency determined for a given number $N_c$ in the vector $N=(N_1, N_2, \ldots N_C)$ (e.g. as determined using Equation (10), and $\omega_c$ is the predetermined weighting factor for a respective incident prediction efficiency $\eta_c(K, N_c)$.

Continuing with the example, above, when C=5, and $\omega_5=0.67$, $\omega_4=0.20$, $\omega_3=0.05$, $\omega_2=0.02$, $\omega_1=0.01$, Equation (12) becomes: η(K, N)=$0.67 \times \eta_5(K, N_5) + 0.20 \times \eta_4(K, N_4) + 0.05 \times \eta_3(K, N_3) + 0.02 \times \eta_2(K, N_2) + 0.01 \times \eta_1(K, N_1)$.

Such weighting coefficients $\omega_c$ determine the relative importance of the number of incidents that occur in each of the number of regions defined in the vector $N=(N_1, N_2, \ldots N_C)$, and can be configured based on historical number of the devices 103 that were available to deploy in a given shift.

Hence, provided herein is a system, device and method for deploying communication devices based on historic incidents. The regions of an area having the highest risk are identified according to a varied weighting of the importance of time and location of historic incidents. Once the highest risk regions are identified according to a given weighting, incident prediction efficiency of the highest risk regions are determined. This process continues, with the highest risk regions changing with each variation on the weighting, until the incident prediction efficiency is maximized. Once the highest risk regions are identified that lead to the incident prediction efficiency being maximized, the communication devices, and respective responders, are deployed to these highest risk regions.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A computing device comprising:
a controller and a communication interface, the controller having access to a memory storing historic incident data, the controller configured to:
determine, for a plurality of regions, predicted incident risks for a given time, based on distance differences and time differences of historic incidents relative to each of the plurality of regions and the given time over a first time period and a distance from each of the plurality of regions, the predicted incident risks further based on incident prediction parameters for weighting the distance differences and the time differences, the historic incidents stored as the historic incident data in the memory;
determine from the predicted incident risks, a subset of the plurality of the regions having highest predicted incident risks;
determine an incident prediction efficiency, for the subset of the plurality of the regions, over a second time period, based on a number of the historic incidents in the subset of the plurality of the regions relative to a total number of the historic incidents for the plurality of the regions;
vary the first time period, the distance, and the incident prediction parameters when determining the predicted incident risks and the subset of the plurality of the regions having the highest predicted incident risks, to maximize the incident prediction efficiency for the second time period;
generate one or more commands for deploying, using the communication interface, communication devices to the subset of the plurality of the regions that result in the incident prediction efficiency being maximized; and
transmit, using the communication interface, the one or more commands to the communication devices and customize each of the one or more commands for deploying a respective communication device to a respective region of the subset of the plurality of the regions.

2. The computing device of claim 1, wherein the controller is further configured to determine the predicted incident risks for the plurality of regions is performed using a non-linear reciprocal function.

3. The computing device of claim 1, wherein the controller is further configured to determine the predicted incident risks and the incident prediction for a given incident type.

4. The computing device of claim 1, wherein the controller is further configured to retrieve respective times and locations of the historic incidents from one or more of: a database of the historic incidents stored in the memory; and a data source computing device different, from the computing device, at which the memory is located.

5. The computing device of claim 1, wherein a number of the regions in the subset of the plurality of the regions having the highest predicted incident risks is predetermined.

6. The computing device of claim 1, wherein the controller is further configured to determine the predicted incident risks for the plurality of the regions from:

$$R(P, t) = \sum_{i=1}^{I} \frac{1}{(1 + \alpha \Delta d_i)(1 + \beta \Delta t_i)}$$

where R is a predicted incident risk for a region, P is a point P in the region, t is the given time, T is the first time period over which the historic incidents occur, D is the distance from the point P within which the historic incidents occur, I is a total number of the historic incidents that occurred within the first time period and within the distance D, i is an integer number indicating an $i^{th}$ historic incident, $\Delta t_i$ is a time difference between a time of the $i^{th}$ historic incident and the given time t, with $0 < \Delta t_i \leq T$, $\Delta d_i$ is a distance difference from the point P in the region to a location of the $i^{th}$ historic incident, with $0 < \Delta d_i \leq D$, $\alpha$ is an incident prediction parameter for weighting the distance difference $\Delta d_i$, and $\beta$ is an incident prediction parameter for weighting the time difference $\Delta t_i$.

7. The computing device of claim 1, wherein the controller is further configured to determine the incident prediction efficiency for the subset of the plurality of the regions over the second time period from:

$$\eta(N) = \frac{\sum_{j=1}^{N} C(S_j)}{C(A)}$$

where $\eta(N)$ is the incident prediction efficiency for the subset of the plurality of the regions over the second time period, N is a total number of the subset of the plurality of the regions, j is an integer number indicating a $j^{th}$ region in the subset of the plurality of the regions, $C(S_j)$ is a number of the historic incidents that occurred in the $j^{th}$ region over the second time period, where S is an identifier of a region, C(A) is a total number of the historic incidents that occurred in the plurality of the regions over the second time period, where A identifies all of the plurality of the regions.

8. The computing device of claim 1, wherein the controller is further configured to determine the incident prediction efficiency for the subset of the plurality of the regions from:

$$\eta(K, N) = \frac{\sum_{k=1}^{K} \sum_{j=1}^{N} C(S_j^k)}{\sum_{k=1}^{K} C(A^k)}$$

where $\eta(K, N)$ is the incident prediction efficiency for the subset of the plurality of the regions over the second time period defined by a total number K of smaller time periods, where N is a total number of the subset of the plurality of the regions, k is an integer number indicating a $k^{th}$ smaller time period, j is an integer number indicating a $j^{th}$ region in the subset of the plurality of the regions, $C(S_j^k)$ is a number of the historic incidents that occurred in the $j^{th}$ region in the subset of the plurality of the regions during a $k^{th}$ smaller time period, where S is an identifier of a region, $C(A^k)$ is a total number of the historic incidents that occurred in the plurality of the regions during the $k^{th}$ smaller time period, where A identifies all of the plurality of the regions.

9. The computing device of claim 1, wherein the incident prediction efficiency comprises an aggregated incident prediction efficiency based on respective incident prediction efficiencies determined for a plurality of subsets of the regions over the second time period, each of the respective incident prediction efficiencies weighted, in the aggregated incident prediction efficiency, according to a predetermined importance of each of the plurality of the subsets of the regions.

10. The computing device of claim 1, wherein the controller is further configured to vary a respective number of the historic incidents used to determine the predicted incident risks as one or more of the first time period and the distance are varied.

11. The computing device of claim 1, wherein the controller is further configured to vary the first time period, the distance, and the incident prediction parameters in one or more of a search, a grid search and a gradient descent search.

12. The computing device of claim 1, wherein the controller is further configured to:
provide the one or more commands at a display device.

13. A method comprising:
determining, at a controller of a computing device, for a plurality of regions, predicted incident risks for a given time, based on distance differences and time differences of historic incidents relative to each of the plurality of the regions and the given time over a first time period and a distance from each of the plurality of regions, the predicted incident risks further based on incident prediction parameters for weighting the distance differences and the time differences;
determining, at the controller, from the predicted incident risks, a subset of the plurality of the regions having highest predicted incident risks;
determining, at the controller, an incident prediction efficiency, for the subset of the plurality of the regions, over a second time period, based on a number of the historic incidents in the subset of the plurality of the regions relative to a total number of the historic incidents for the plurality of the regions;
varying, at the controller, the first time period, the distance, and the incident prediction parameters when determining the predicted incident risks and the subset of the plurality of the regions having the highest predicted incident risks, to maximize the incident prediction efficiency for the second time period;
generating, at the controller, one or more commands for deploying communication devices to the subset of the plurality of the regions that result in the incident prediction efficiency being maximized and
transmitting the one or more commands to the communication devices, wherein each of the one or more commands is customized for deploying a respective communication device to a respective region of the subset of the plurality of the regions.

14. The method of claim 13, wherein the determining the predicted incident risks for the plurality of regions is performed using a non-linear reciprocal function.

15. The method of claim 13, wherein the predicted incident risks and the incident prediction efficiency are determined for a given incident type.

16. The method of claim 13, wherein the predicted incident risks for the plurality of the regions are determined from:

$$R(P, t) = \sum_{i=1}^{I} \frac{1}{(1 + \alpha \Delta d_i)(1 + \beta \Delta t_i)}$$

where R is a predicted incident risk for a region, P is a point P in the region, t is the given time, T is the first time period over which the historic incidents occur, D is the distance from the point P within which the historic incidents occur, I is a total number of the historic incidents that occurred within the first time period and within the distance D, i is an integer number indicating an $i^{th}$ historic incident, $\Delta t_i$ is a time difference between a time of the $i^{th}$ historic incident and the given time t, with $0 < \Delta t_i \leq T$, $\Delta d_i$ is a distance difference from the point P in the region to a location of the $i^{th}$ historic incident, with $0<\Delta d_i \leq D$, $\alpha$ is an incident prediction parameter for weighting the distance difference $\Delta d_i$, and $\beta$ is an incident prediction parameter for weighting the time difference $\Delta t_i$.

17. The method of claim 13, wherein the incident prediction efficiency for the subset of the plurality of the regions over the second time period is determined from:

$$\eta(N) = \frac{\sum_{j=1}^{N} C(S_j)}{C(A)}$$

where $\eta(N)$ is the incident prediction efficiency for the subset of the plurality of the regions over the second time period, N is a total number of the subset of the plurality of the regions, j is an integer number indicating a $j^{th}$ region in the subset of the plurality of the regions, $C(S_j)$ is a number of the historic incidents that occurred in the $j^{th}$ region over the second time period, where S is an identifier of a region, C(A) is a total number of the historic incidents that occurred in the plurality of the regions over the second time period, where A identifies all of the plurality of the regions.

18. The method of claim 13, wherein the incident prediction efficiency for the subset of the plurality of the regions is determined from:

$$\eta(K, N) = \frac{\sum_{k=1}^{K} \sum_{j=1}^{N} C(S_j^k)}{\sum_{k=1}^{K} C(A^k)}$$

where $\eta(K, N)$ is the incident prediction efficiency for the subset of the plurality of the regions over the second time period defined by a total number K of smaller time periods, where N is a total number of the subset of the plurality of the regions, k is an integer number indicating a $k^{th}$ smaller time period, j is an integer number indicating a $j^{th}$ region in the subset of the plurality of the regions, $C(S_j^k)$ is a number of the historic incidents that occurred in the $j^{th}$ region in the subset of the plurality of the regions during a $k^{th}$ smaller time period, where S is an identifier of a region, $C(A^k)$ is a total number of the historic incidents that occurred in the plurality of the regions during the $k^{th}$ smaller time period, where A identifies all of the plurality of the regions.

19. The method of claim 13, wherein the incident prediction efficiency comprises an aggregated incident prediction efficiency based on respective incident prediction efficiencies determined for a plurality of subsets of the regions over the second time period, each of the respective incident prediction efficiencies weighted, in the aggregated incident prediction efficiency, according to a predetermined importance of each of the plurality of the subsets of the regions.

20. The method of claim 13, further comprising
providing the one or more commands at a display device.

* * * * *